US008803913B1

(12) United States Patent
Edmonston

(10) Patent No.: US 8,803,913 B1
(45) Date of Patent: Aug. 12, 2014

(54) SPEED MEASUREMENT METHOD AND APPARATUS

(71) Applicant: Brian Scott Edmonston, Poway, CA (US)

(72) Inventor: Brian Scott Edmonston, Poway, CA (US)

( * ) Notice: Subject to any disclaimer, the term of this patent is extended or adjusted under 35 U.S.C. 154(b) by 0 days.

(21) Appl. No.: 14/021,041

(22) Filed: Sep. 9, 2013

(51) Int. Cl.
G09G 5/00 (2006.01)
(52) U.S. Cl.
USPC .......................................... 345/629; 386/226
(58) Field of Classification Search
USPC .......................................... 345/629; 386/226
See application file for complete search history.

(56) References Cited

U.S. PATENT DOCUMENTS

| 6,587,574 B1 * | 7/2003 | Jeannin .......................... 382/107 |
| 2004/0109059 A1 * | 6/2004 | Kawakita ....................... 348/143 |
| 2008/0044155 A1 * | 2/2008 | Kuspa ............................... 386/52 |
| 2008/0219509 A1 * | 9/2008 | White et al. ................... 382/107 |

* cited by examiner

Primary Examiner — Maurice L McDowell, Jr.
(74) Attorney, Agent, or Firm — Brian S. Edmonston

(57) ABSTRACT

A method and apparatus for measuring a speed of an object is provided. The speed is measured by taking a video of said object moving across a span. The object may be a baseball thrown from the pitcher's mound to home plate. The invention may include a device that with a video camera, a display screen and a control interface. The device generates a video of the object moving from a start point to an end point. The video frames for the start point and the end point are identified and the time span between the start frame and the end frame is determined. A distance between the start point and the end point is also determined. The speed of the object is then calculated from the time span and the distance. The information may then be displayed including a path trace and the calculated speed.

30 Claims, 9 Drawing Sheets

SPEED MEASUREMENT METHOD AND APPARATUS

1. FIELD OF THE INVENTION

Figure 1:
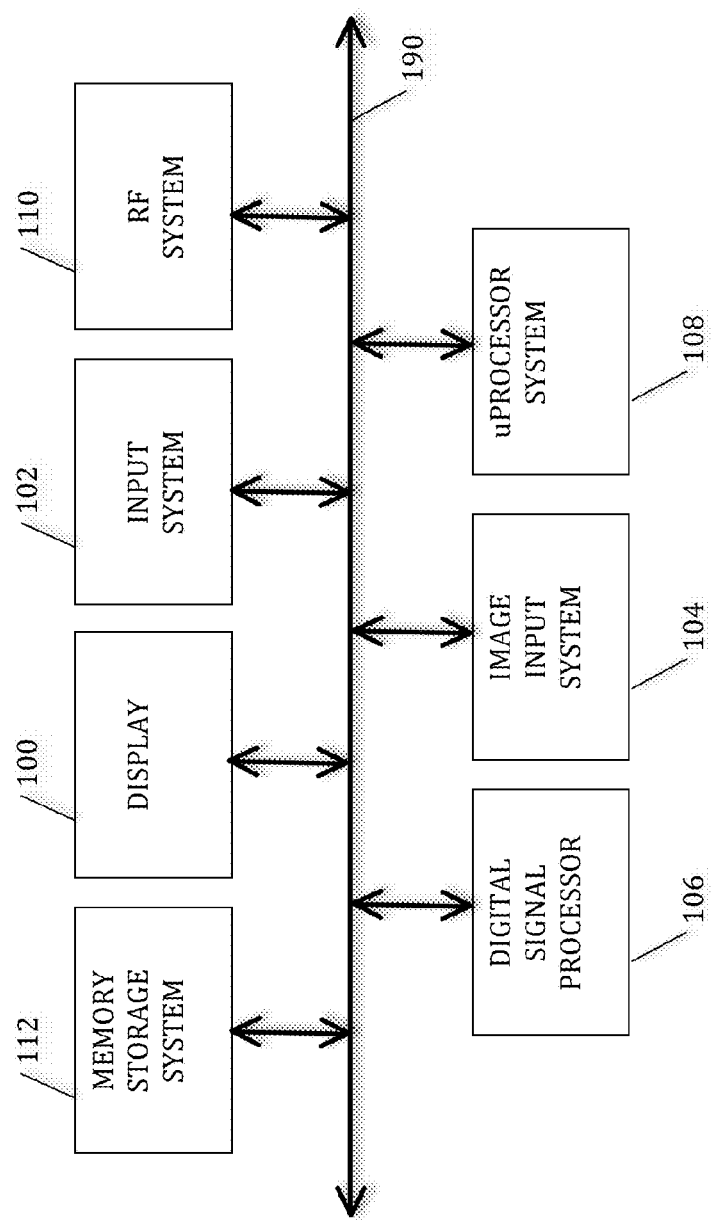

The present invention is directed to measuring the speed of a moving object. More particularly, the present invention is a method and apparatus for measuring a baseball pitch using an interactive camera or other recording device.

2. BACKGROUND OF THE INVENTION

The speed of an object may be measured using a radar based measurement device. The radar based measurement device bounces a radio signal off a moving object and measures the frequency shift to calculate the speed of the object.

Radar based measurement devices are useful for all sorts of speed measurements including object velocity measurements for sports or vehicle speed measurements for law enforcement purposes. Radar based measurement devices are highly useful.

Radar based measurement devices are highly specific equipment, however, typically able to only perform one function. Unless one knows they will be performing a speed measurement at a particular place or time, it is unlikely a radar based measurement device will be on hand.

In some cases it would be useful to be able to perform unplanned speed measurements. This could be at a baseball game or tennis match. In these situations it would be useful to have a way to perform speed measurements using a device that it typically available or that is normally carried.

Certain applications ("apps") for mobile smart phones for measuring the speed of thrown pitch exist. These applications require you touch a 'button' at the start of the pitch and then release the button when the pitch is caught by the catcher. The speed of the pitch is estimated based on the time during which the button was depressed. Depressing a button on a touch screen is a highly inaccurate process, however. Errors of even a 0.1 of a second are very common. As such, the speed estimate made by these applications are highly inaccurate.

Additionally, there are other smart phone applications that allow video to be taken and the video to be reviewed in slow motion or in single frame steps. Such apps are helpful for observing object and people moving at relative higher speeds. However, these slow motion apps are not configured to allow for measurement of the speed of a thrown object.

3. BRIEF DESCRIPTION OF THE INVENTION

In accordance with an exemplary embodiment of the invention a method for measuring a speed of an object by taking a video of said object moving across a span is provided. The method includes selecting a first point in the span and selecting a second point in the span, wherein the second point is a known distance from the first point. A time span is then calculated for the object to move from the first point to the second point and the speed of the object is calculated using the known distance and the time span.

In accordance some embodiments of the invention the device includes a video camera, a display screen and a control interface. The device generates a video of an object moving from a start point to an end point. The video frames for the start point and the end point are identified and the time span between the start frame and the end frame is determined. A distance between the start point and the end point is also determined. The speed of the object is then calculated from the time span and the distance.

In accordance with another embodiment of the invention, the video of the moving object is displayed on said display screen. A user moves through the video and identifies a start frame and an end frame. The user may also input a distance or select from a set of preprogrammed distances. Once the start frame and end frame have been identified the device calculates a speed and displays the speed on the display. The video may be replayed at a slow or normal speed. The start frame and end frame may be indicated via indicia that are also displayed on top of or next to video. In still other embodiments of the invention a path trace is added to the video that traces the path of the moving object for enhanced viewing. A max, average and minimum speed may be displayed. Also the type of pitch may also be displayed.

4. LIST OF FIGURES

FIG. 1 is a block diagram of a device configured in accordance with an exemplary embodiment of the invention.

FIGS. 2A-G are illustrations of the display and input screen when configured in accordance with an exemplary embodiment of the invention.

Figure 3:
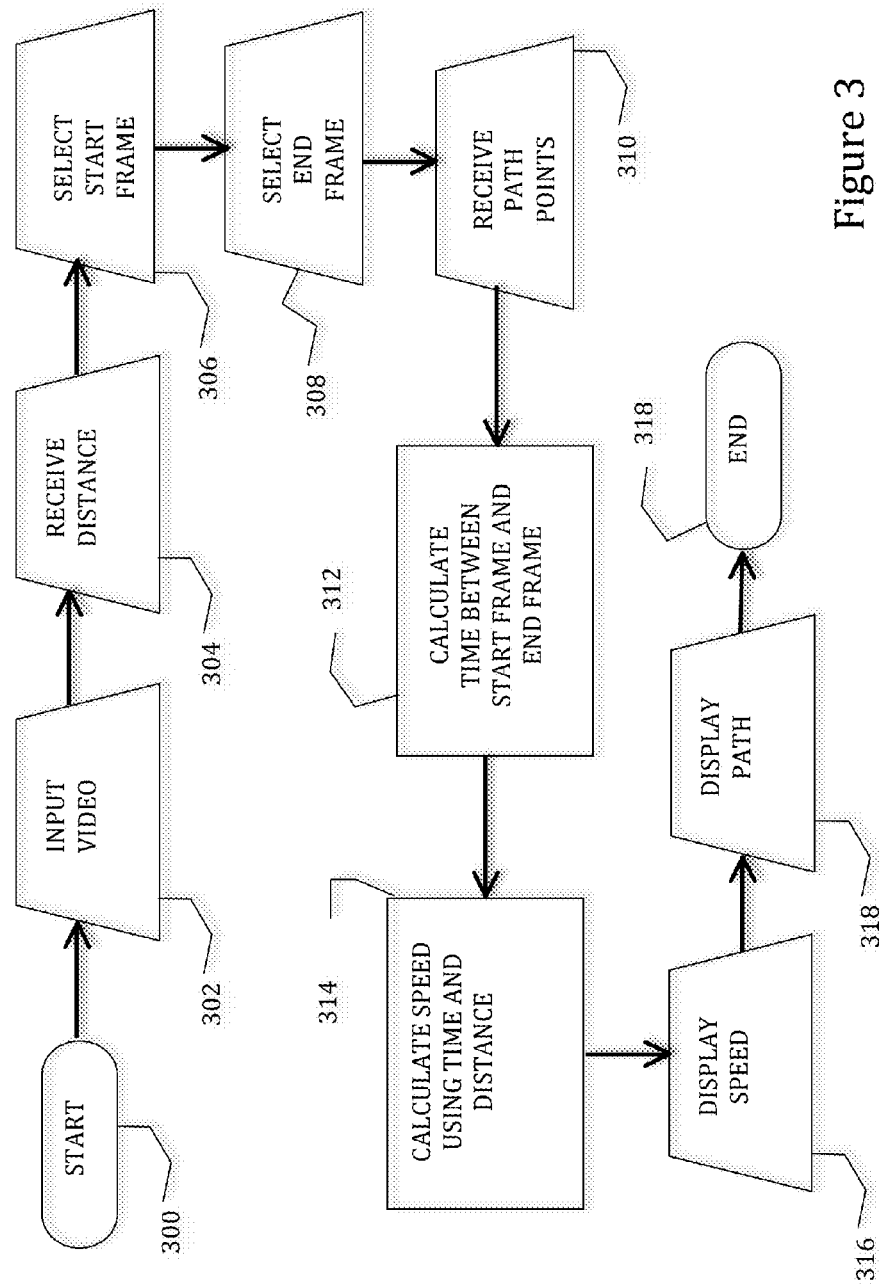

FIG. 3 is a flow chart illustrated the steps performed in accordance with an exemplary embodiment of the invention.

5. DETAILED DESCRIPTION OF THE INVENTION

FIG. 1 is a block diagram of a device configured in accordance with an exemplary embodiment of the invention. The blocks are preferably implemented using semiconductor devices coupled together via wire traces implemented on circuit boards and/or cable based wire connections. The device includes a display system 100 coupled to communications bus 190. Communications bus 190 is also coupled to input system 102, radio frequency system 110, microprocessor system 108, image input system 104, memory storage system 112 and digital signal processing system 106. Communications bus 190 exchanges data with the various other systems that are attached to it. In some embodiments of the invention the device is a mobile telephone with video camera including smart phones such as iOS™ based smart phones or Android™ based smart phones. Devices such as tablets and music players with cameras, input systems and cameras (such as iPod Touch™) may also be used in some embodiments of the invention.

During operation display system 100 will display images to a user. These images will include images such as videos or photos as well as graphics that provide information or that request input. In some cases the graphics and images may be overlaid or adjacent to one another. Display system 100 may be an LED screen or OLED as is commonly used in a wireless communications device such as cell phone or mobile phone. Display system 100 is typically controlled by microprocessor system 108 or a graphics controller unit under the control of microprocessor system 108. Other types of displays include plasma or video CRT.

Input system 102 receives user input. In a typical embodiment of the invention the user input is provided to microprocessor system 108, which performs control tasks in response. Microprocessor system 108 typically performs its control functions using instructions and data (software) stored in memory storage system 112 and which are received via communications bus 190. Memory storage system 112 will typically include RAM, SRAM and/or disk based storage, or some combination or subset thereof.

In a preferred embodiment of the invention input system 102 is typically a touch screen positioned over the display system 100 to form an integrated touch and display screen to allow easy interaction and control of the device using a unified interface. Other embodiments of the invention may include an input system that is separate from the screen such as a thumb keyboard or tactile based input. Other embodiments of the invention my use a video camera with hand gesture recognition as an input mechanism. Still other embodiments may use voice or sound based input with voice recognition that converts the sounds into commands.

Some embodiments of the invention may include radio frequency system 110. RF system 110 transmits and receives radio signals to allow the device to communicate with other devices and networks. Examples of wireless protocols that may be implemented using RF interface include cellular communications standards such as 3G or 4G LTE (Long Term Evolution), Wi-Fi and Bluetooth. Additional processing of these waveforms may be performed by digital signal processor 106. In a preferred embodiment of the device used to implement the invention will be a cell phone or tablet based computer that is typically carried by a person during most of the day. Videos and materials generated by the device may be transmitted or shared via RF interface 110. Alternatively, a cable connector may be used to share receive data.

During exemplary operation of the invention a user will capture a video of a moving object using image input system 104, which is typically a video capable camera. In an exemplary use the moving object will be a baseball thrown by a pitcher to a catcher. The video is taken by simply pointing the image input system 104 at the pitcher while the baseball is being thrown. In some embodiments the video may by taken by another device and imported into the current device for further manipulation and processing.

The user will preferably take a video that includes both a starting point and an ending point for the moving object during the entire video. So, in the case of a pitched baseball the video would include the pitcher (start point) as well as the catcher (end point). In other embodiments of the invention the start point and end point may not be included in every frame of the video. Rather, the video will include a frame with the object located at the start point as well as a frame with the object located in the end point. That is, the camera may pan from the start point to the end point with the movement of the object. It is typically more difficult to video record a moving object so it is generally preferable to have the video include the start and end points during the entire span of time the object is moving.

Figure 2A:
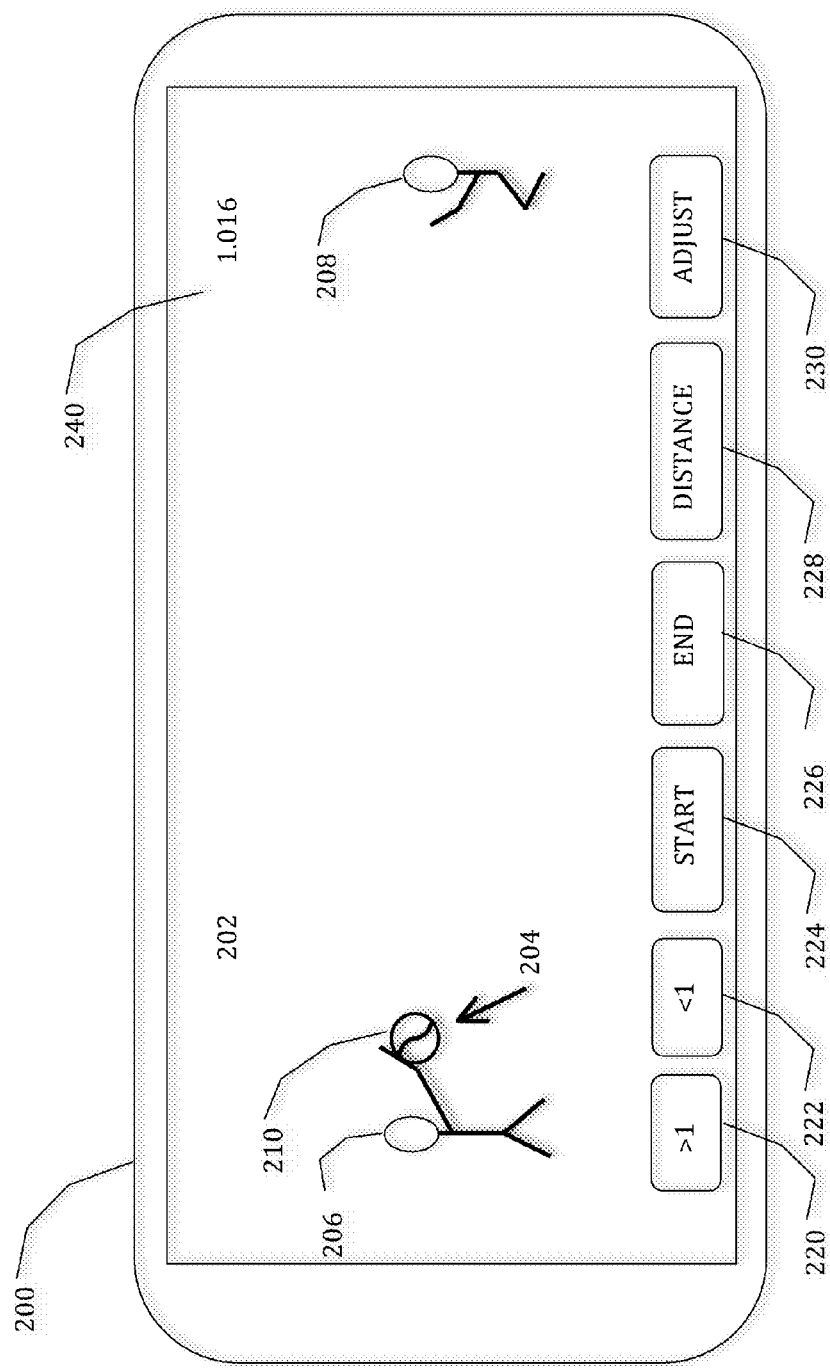

FIGS. 2A-G are simplified illustrations of a display given to the user when configured in accordance with an exemplary embodiment of the invention. In accordance with this embodiment of the invention, once the video has been taken or imported the device will enter the frame selection mode which is illustrated in FIG. 2A. This mode may be entered either automatically or in response to user input.

As shown in FIG. 2A, device 200 includes input and display screen 202 which is typically a touch screen display. Within input and display screen 202 video frames are displayed. The video frames may be advanced using increment button 220 or reversed using decrement button 222. The buttons are typically selected by touching the area over the screen. Other embodiments of the invention my include additional or alternative forward and reverse inputs including slow forward and reverse and normal speed forward and reverse as well as stop or pause inputs. Buttons that move a fixed number of multiple frames are also consistent with various embodiments of the invention.

In the exemplary use described herein the displayed video includes a pitcher 206, a catcher 208 and a baseball 210. Additionally, a frame time stamp 240 may be displayed. The user will typically move through the frames using the increment and decrement buttons 220 and 222. When the frame during which baseball 210 is just leaving the hand of pitcher 206 is identified (shown at location 204) the start frame identifier input 224 may be selected to indicate the start frame within the video.

Typically, the start frame is the frame during which the object is first moving away from the origination location. For example, for a pitched baseball the start frame would be the frame during which the baseball is just leaving, or just about to leave, the hand of the pitcher.

Figure 2B:
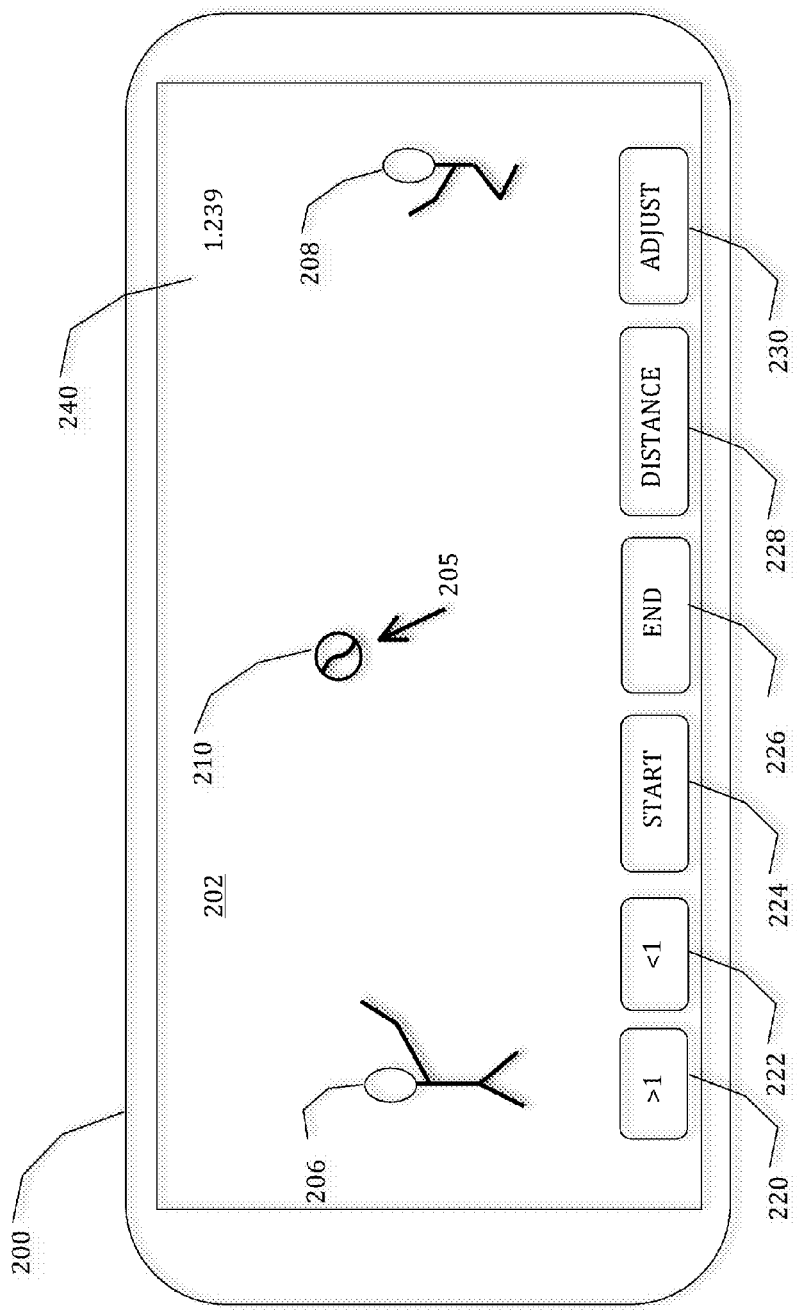

FIG. 2B shows device 200 displaying another frame from the video where baseball 210 is located at location 205. This frame may be arrived at by selected increment button 220 one or more times or by moving through the frame via video play and pause. Time stamp 240 has been updated to reflect the time of the currently displayed frame. In some embodiments of the invention the user may touch location 205 to indicate where baseball 210 is located on the frame. This may be done on some or all of the frames that occur after the start frame up to the final frame used in the speed estimation. The baseball 210 location within frames may be used for additional enhancement of the video as described in more detail below.

Figure 2C:
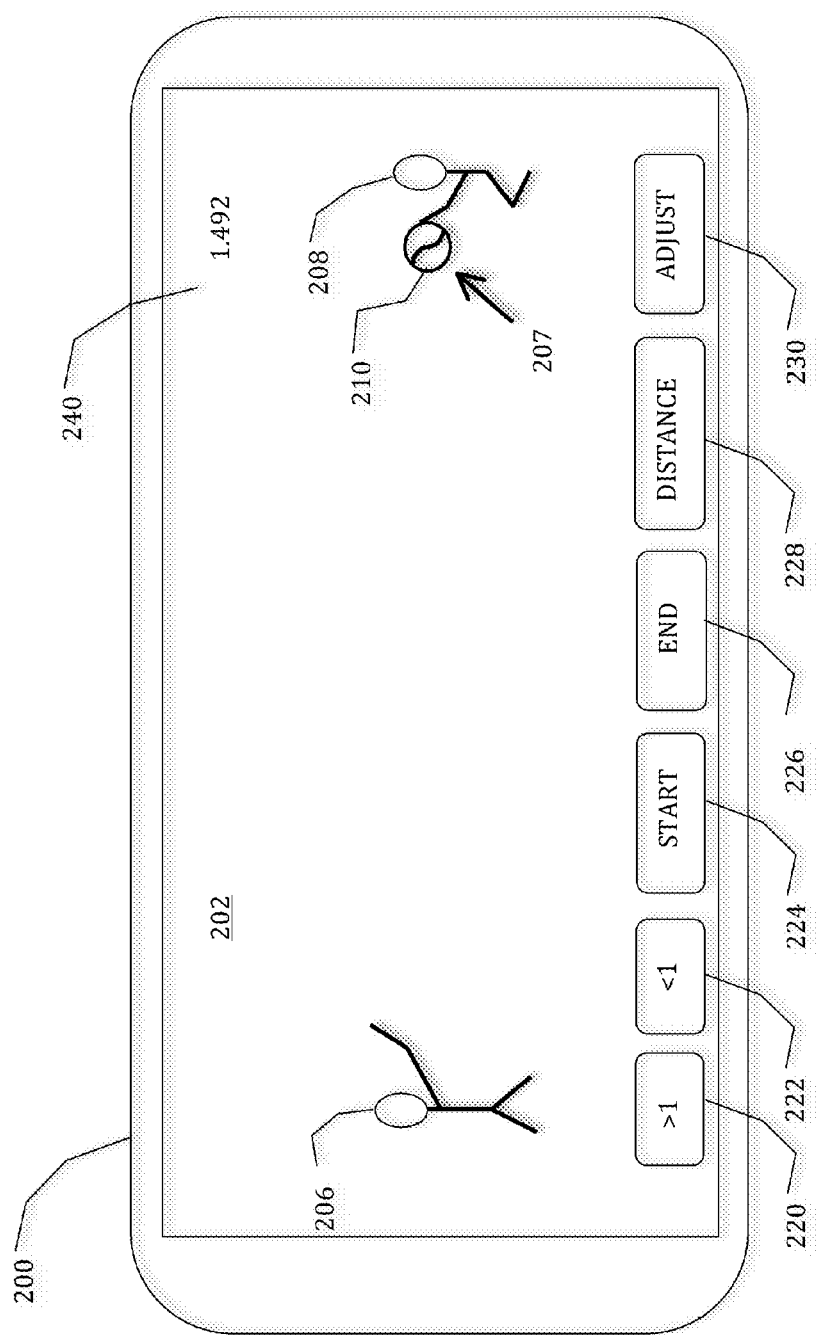

FIG. 2C shows device 200 displaying a frame during with baseball 210 has arrived at catcher 208 at location 207. In this frame location 207 is the end point of the movement of the object (baseball 210) and thus the displayed frame should be designated as the end frame. In the described embodiment, the end frame is indicated by selection of end frame select button 226.

Other methods for selected the start or end frames may be used in accordance with other embodiments of the invention. For example, multiple frames may be displayed in chessboard fashion and the start and end frames may be selected by just touching on the location of the desired frame. The frames may alternatively be displayed with associated numbers or other indicia and the indicia of the desired frame(s) input to indicate selection of the start and end frames. As noted above, voice commands or hand gestures may also be used to indicate the start frame and the end frame.

In still other embodiments of the invention motion detection may be used to determine the start and the end frames. In one embodiment the motion detection will search for objects moving above a certain speed. When this motion is first detected that corresponding frame will be the start frame. When the motion is not longer detected the frame will be designated as the end frame. In other embodiments of the invention a minimum, or final, speed may also be displayed. The search may also be performed by looking for highly linear movements.

Figure 2D:
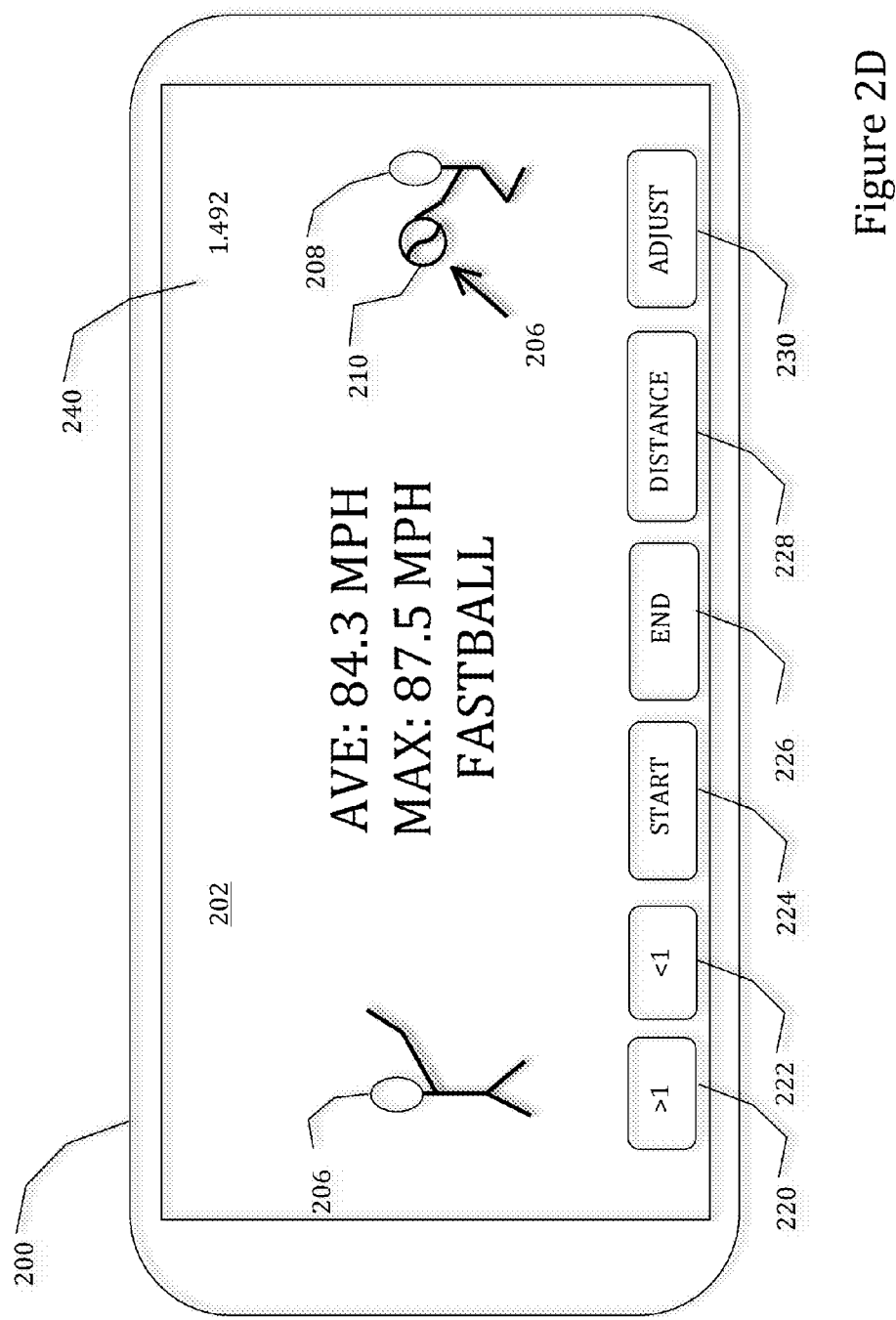

FIG. 2D shows the display of information when performed in accordance with an exemplary embodiment of the invention. In this embodiment the video is played back so that a view may view the pitch. At the end of the playback the average speed is displayed along with the maximum speed. The display of the speed is preferably overlaid on the end frame or frames occurring after the end frame. Additionally, the type of pitch may also be displayed. The type of pitch is typically input by the user.

Figure 2E:
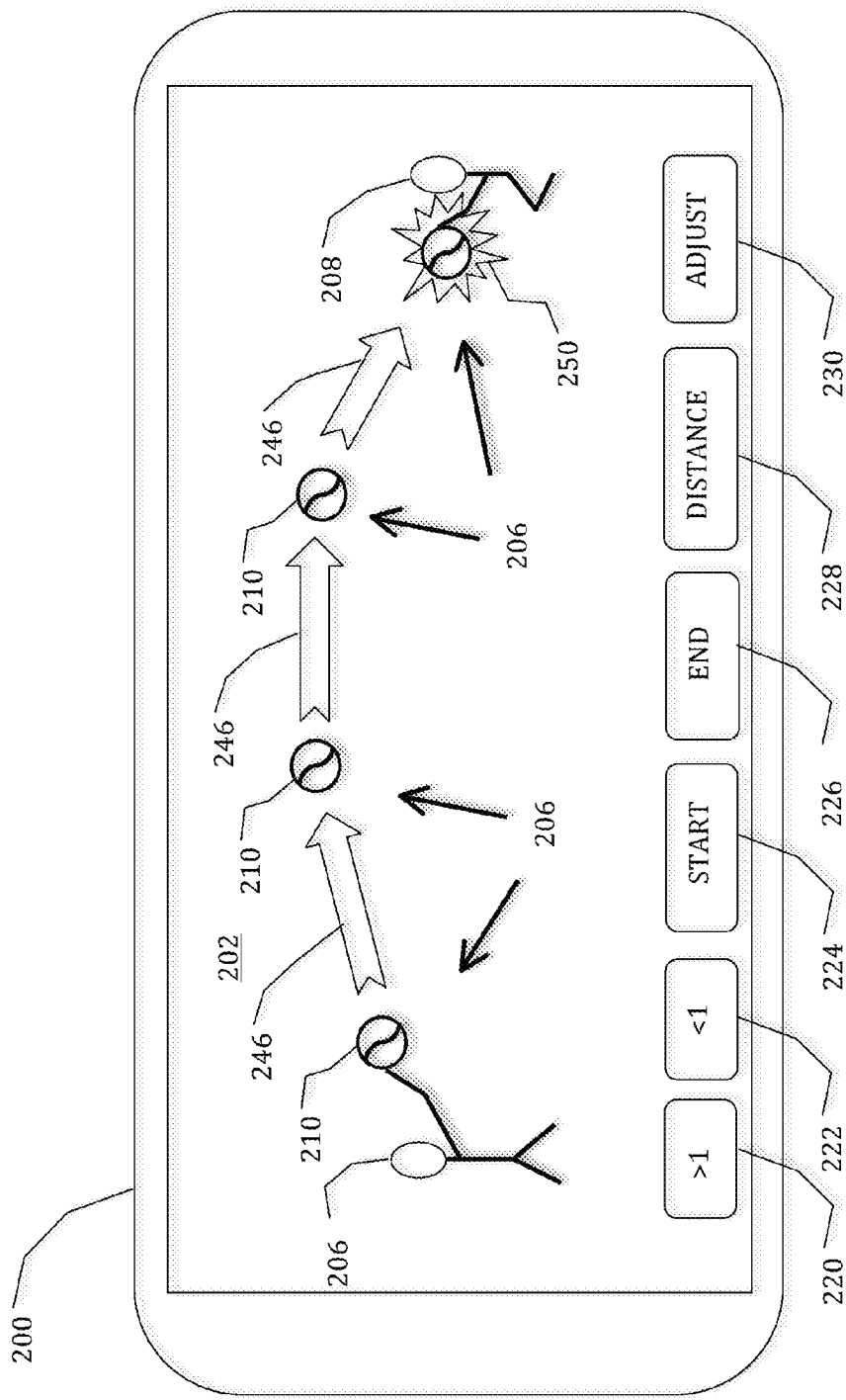

FIG. 2E shows a video playback done in accordance with an exemplary embodiment of the invention. The figure is meant to represent a series of frames played back in a "review" mode, but may also be a single composite frame in other embodiments of the invention. As the video is replayed on display 202 indicia 246 are overlaid on the video. In the exemplary embodiment the indicia are tracer lines or arrows drawn between the locations 206 of baseball 210 as it moves from frame to frame. The indicia may be straight lines or quadratic curves use to approximate the normal arcing of a thrown object. The indicia 246 allow for better tracking of the ball 210 as it travels thereby enhancing the review experience. The use of other types of indicia may also be used including curves lines, dotted lines, "shadow" balls or object that create a tail effect. Those skilled in the art will recognize still other types of useful indicia for demonstrating the flight of a moving object.

Additionally, indicia 250 may also be added at the final location of baseball 210 as a form of end frame indicator. Indicia 250 may be some sort of burst or explosion graphic. This further enhances the viewing experience. The video segment including indicia 246 and 250 may be combined with the display of the speed(s) and pitch type as well as other information such as the pitchers name to form an exportable enhanced video that may be sent to other for viewing. Multiple different segments may be concatenated to form a compilation to highlight the various pitches and capabilities of a pitcher. Additional indicia may be added at the start location of the baseball in the start frame as a start frame indicator.

Other forms of indicia and/or graphics may include simple highlighting of the entire frame such as a change in the coloration. In a one embodiment the overlay would be a mark at or near the location of the moving object on the video frame. Alternative indicia might include star or burst graphic at the release point of a thrown pitch and/or the end point of the thrown pitch. The location of the start point and end point on the start frame and end frame may be indicated by touching the screen over the start point and/or end point in some embodiments of the invention.

In an exemplary embodiment of the invention the playback may be performed at alternative speeds, including an accelerated playback or a slow motion playback. The video can then be viewed or exported for sharing and viewing by others. In some embodiments of the invention, multiple video segments may be appended to one another and then the entire group of segments exported as a single video. This allow for a video that include multiple displays of the same pitch, including normal motion and slow motion, as well as for a compilation of pitches to, for example, highlight a particular pitcher's repertoire.

Additionally, in an exemplary embodiment of the invention additional video segments may be inserted into the video. These additional video segments might include segments created by the user such as comments by a coach or parent. Alternatively, the additional video segments might include cheers or "trash talk" statements from the pitcher himself or from the pitcher's teammates. The additional video segments might also include highly exaggerated strike calls or humorous physical comedy.

In one exemplary embodiment, the additional video segments might include actions from celebrities, known sports figures or professional umpires. Also, videos with animated characters may also be included. These segments might be made available as an "in app" purchase for additional payments. Such payments could be shared with the commercial entity behind the know person or character.

Other graphics that might be useful for video segments to insert include fireworks, trains, automobiles including race cars, rockets, planes and other interesting visuals that would enhance the production of the video. Again, such prepared segments could be made available for additional in app purchase.

In FIGS. 2A-2G device 200 may include distance input button 228 and adjust input button 230. These inputs are typically selected by touching the area over them. The distance button is used to specify the distance between the start and end points of the moving object. Adjust button 230 is used to further adjust the distance between the start and end points.

Typically the distances may be selected from the set of distances in a configuration section of the invention or on the main display screen where the video and/or video frames are being displayed. Additionally, in some embodiments of the invention custom distances may be entered via typing or other input method well know or described herein.

For example, the speed measurement system may offer multiple preset distance options for easy configuration and calculation. These preset distance option may include little league mound-to-plate distance of 46 feet, major league distance of 60.5 feet, softball distances of 36 and 40 feet, or some subset thereof. Other embodiment may include preset mound-to-plate distances of 50 feet for intermediate league and 54 feet for junior league. Still other embodiments of the invention may include 43 feet for junior, senior and big league softball. Various embodiments of the invention may include all or some subset of the preset distances listed about as well as additional distances that may be useful. In some embodiments of the invention the device may use a fixed distance for a known application or sport and thus no distance need be entered.

Other embodiments of the invention may include the distance from the service line of a tennis court to the center of the service box. This can be used to estimate the speed of a tennis serve. The accuracy of the service speed can be further adjusted using an adjust factor to account for the location in which the service lands in the service box to further increase accuracy.

Figure 2F:
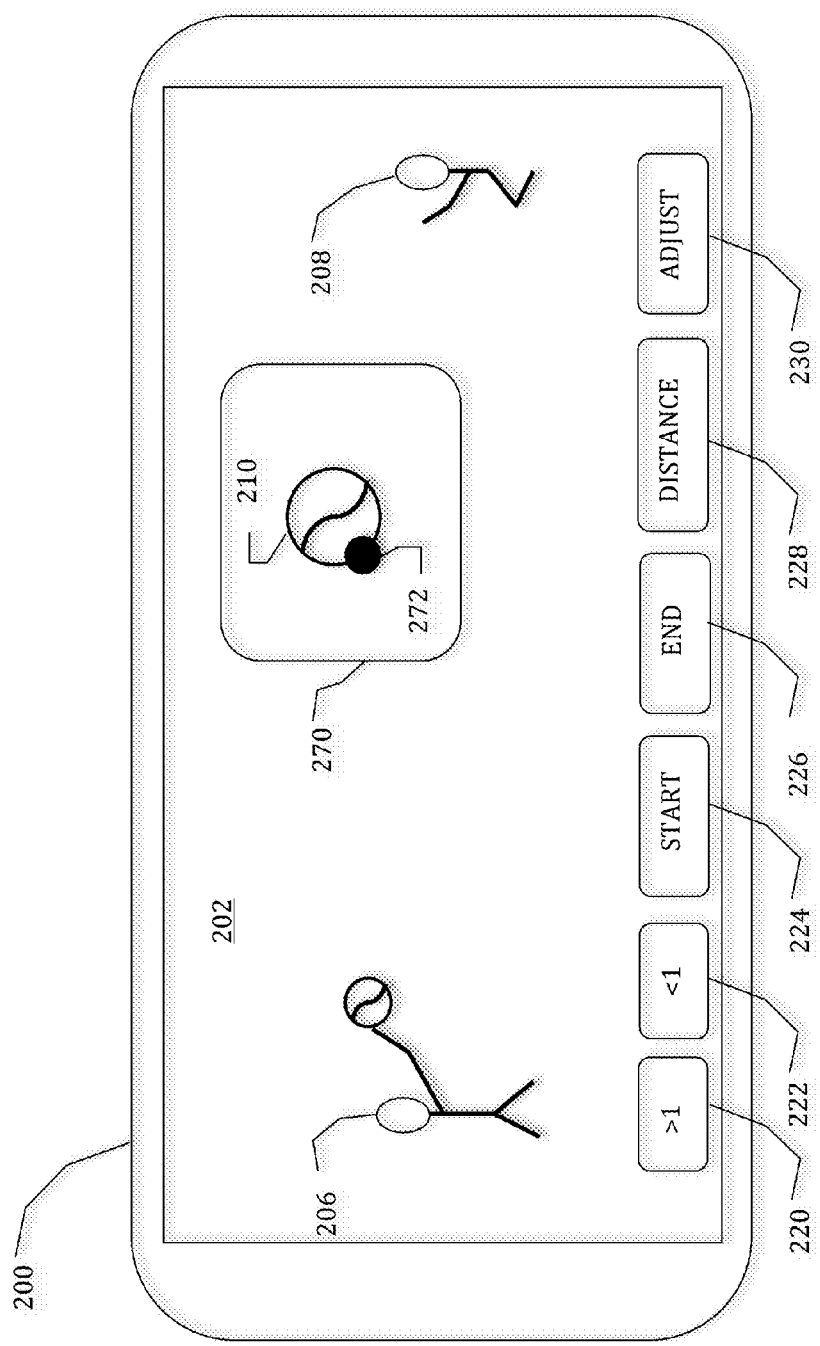

FIG. 2F shows an enhanced entry of the object location when performed in accordance with some embodiments of the invention. To increase the accuracy of the location points of baseball 210 within a frame, an expansion window 270 is created when the user touches the display and input screen 202. In this mode, the resolution of the area around touch point 272 is increased. In an exemplary embodiment the increase is 2 times the display resolution of the frame. Thus, baseball 210 is shown larger within expansion window 270. Touch point 272 can then be moved until it is directly over baseball 210 so a more exact location point within the frame is provided. The object location point may be entered for each frame using the expansion window 270 to provide for higher quality playback and indicia location provided during playback. Alternative methods for higher resolution location input include zooming the entire frame via methods well know in the art including the pinch and separate motion over the display window.

Figure 2G:
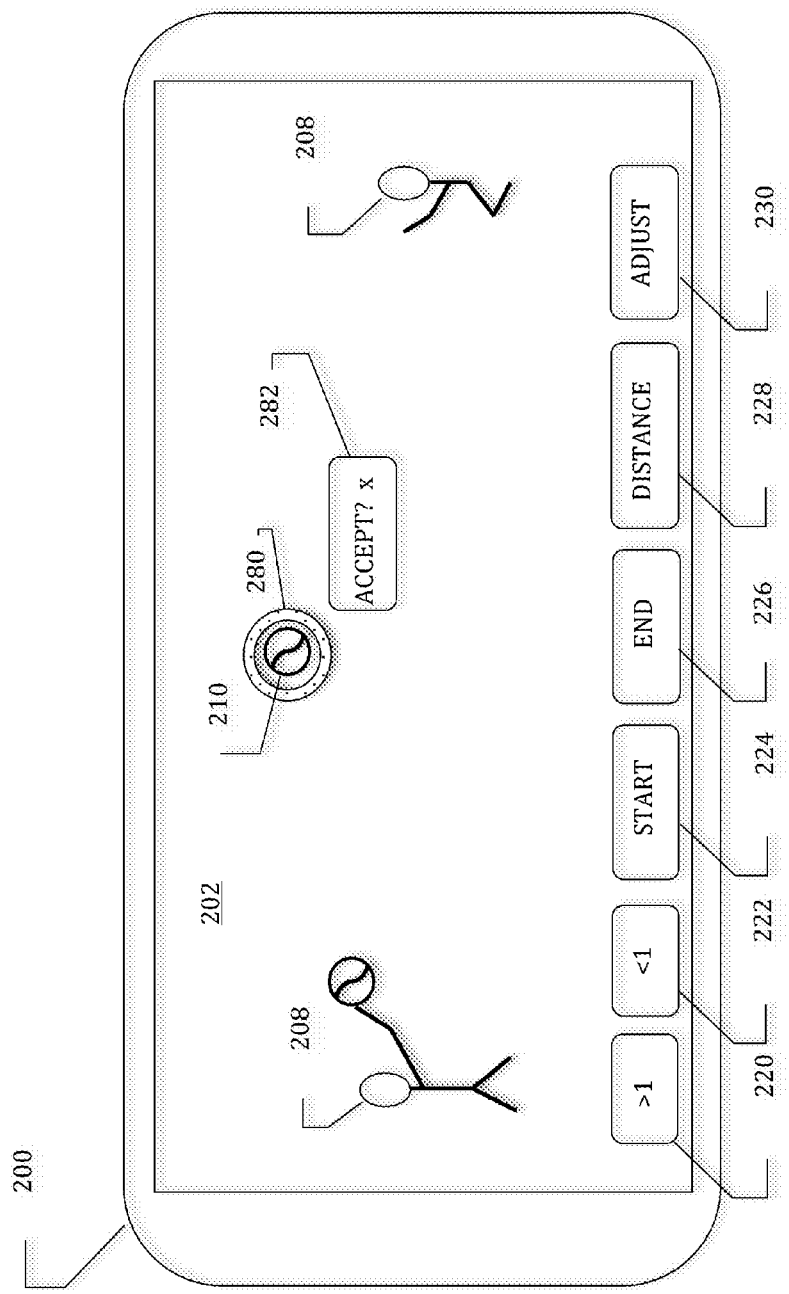

FIG. 2G shows an alternative method to input the object location point when performed in accordance with some embodiments of the invention. In this method the location of the moving object (baseball 210) is done by movement detection software routines applied to the video stream. Once the application of the movement detection is completed the estimated location of the moving object is displayed in each frame via a location point indicia 280, shown here as a circular graphic around baseball 210. In addition to the location point indicia 280, an accept button 282 may be provided. If the location point indicia corresponds to the actual location of baseball 210 within the frame the user may touch accept button 282 over the center of the button. If the location is not correct, the user may touch over the 'x' portion of the accept button 282 to reject the location. Those skilled in the art will recognize other method to accept or reject the proposed location offer by the motion detection software.

In some embodiments of the invention, if the proposed location of the moving object is rejected the software may enter a manual location input mode. In the manual location input mode the location of the moving object may be entered by the user by touching the location on the screen over the object and/or using the expansion window technique as described above with reference to FIG. 2F.

FIG. 3 is a flow chart illustrated the speed calculation when performed in accordance with various embodiments of the invention. These steps shown are typically done by the software running on the microprocessor of the device or on the microprocessor of a remote device. The process starts at step 300 and at step 302 the video of the moving object is input. This step can be performed by actually taking the video using a video recording system or by loading a previously recorded video.

At step 304 the distance the object travels is received. This may be a number stored in the software application or may be a number entered by the user previously, during or after the video has been recorded. Typically, this will be the distance from the pitchers mound to home plate, but other distances are consistent with various embodiments of the invention.

At step 306, the start frame of the video is selected. This is typically done via user input as described above, but may also be done via motion recognition. In the case of motion detection or recognition, the frames are analyzed until a moving object is detected. At step 308 the end frame is selected. Again, this is typically done via user input as described above, but may also be done using motion detection or recognition. In the case of motion recognition, in some embodiments the path of the object is followed until movement is no longer detected. The frame after motion is no longer detected is the end frame.

At step 310 the path points are received. The path points are points where the object is located in video frame between the start frame and the end frame. The path points (also referred to as object location points) may be entered as described above including touching the screen at the location of the object in each frame or the via motion detection.

At step 312 the time duration between the start frame and end frame is calculated. This may be done in various ways well known in the art including calculating the difference between the time stamp of the start frame and the end frame or by multiplying the number of frames between the start frame and the end frame and multiplying that by the frame rate.

At step 314 the speed of the object is calculated by dividing the distance by the time. This calculates the average speed of the object. A maximum speed may be also calculated by using an air resistance table and determining how much a thrown baseball slows down due to air resistance and then adding half that slow down factor to the average speed. A minimum speed can similarly be estimated by subtracting half the slow down factor. The slow down factor can further be adjusted for distance, humidity, air pressure and altitude in various embodiments of the invention to increase accuracy.

At step 316 the speed is displayed. The speed is typically displayed over, or just after, the last frame. It may also just be displayed independently or recording to a file or e-mail for later use or transmission. The display may include the average, high or minimum speed or some combination thereof.

At step 318 the path of the object is displayed. The path is comprised of the set of path points. The path may be displayed in a single composite image with a line drawn over the path points, or it may be displayed during the replay of the video with indicia overlaid on the video at or between the path points.

The process ends at step 318. It should be understood that the process shown in FIG. 3 is just an exemplary embodiment of the invention. Other embodiments of the may include only some of the steps shown as well as additional steps not shown. Additionally, the order of some steps may be changed in other embodiments of the invention. More detail as to how some of the steps may be preformed in various embodiments of the invention is provided below.

Referring again to step 312, the time span between the start frame and the end frame may be calculated in a variety of ways. In a first embodiment, the number of frames between the start and end frame may be determined and then that number is multiplied by the frame rate. For example, for a video stream taken at 60 frames per second (fps) the time gap between frames is 0.0167 seconds (16.7 ms). If the start frame is frame 20 and the end frame is frame 48 there are 28 frames between the start and end frames. Given the time gap between frames of 0.0167 the total time span is 0.4676 seconds (0.167*28). Dividing 60.5 feet (distance from pitchers mound to the plate) by 0.4676 seconds gives a speed of 129.38 ft/second. It is simple calculation to convert that speed to 88.2 miles per hour (129.38*3600/5280).

Many other alternative methods for calculating the time span and the speed may be used in alternative embodiments of the invention. For example, each frame may also have a time stamp. In this case, the time stamp of start frame and the end frame need only be determined and the time span calculated as the difference between the two. Thus, if the start frame has a time stamp of 1.20 seconds and the end frame has a time stamp of 1.67 seconds the time gap between the frames is 0.47 seconds. If the speed measurement is for a pitch thrown in a major league sized baseball field the distance is 60.5 feet the speed is 128.7 ft/sec or 87.8 mph. Those skilled in the art will recognize other methods to calculate the time span between two frames in a video stream that may be used in accordance with other embodiments of the invention.

It should be clear that the higher the frame rate of the video stream the more accurate the speed calculation of the object can be. For example, with a 60 fps video each frame is separated by 0.0167 seconds. For a distance of 60.5 feet the resolution is on the order of 3.5 miles per hour per frame for an 85 mile per hour pitch. At a frame rate of 120 fps the resolution improves to about 1.85 miles per hour for each frame. These resolutions are generally acceptable and will be available in the most current or soon-to-be-introduced video capture systems in mobile telephones as well as other video systems. While higher frame rates are preferred, and in particular rates at or above 60 fps, even at the most typical frame rate of 30 fps useful speed calculations can be made.

As described above with reference to FIGS. 2A-G an adjust input 230 is provided in some embodiments of the invention. In an exemplary embodiment the adjust factor may be used to adjust for a difference in the standard distance the actual distance travelled. For example, the distance from the rubber on the pitchers mound to home plate is known and may be set to 60.5 feet for a major league baseball field. However, the pitcher does not typically release the ball directly over the rubber. Rather, the pitcher releases the ball from his hand at some point in front of the rubber as he extends his body towards home plate to make the throw. Thus, the measurement distance will not be exactly the distance between home plate and the pitcher's rubber. To correct for this an adjustment factor may be entered. The adjustment factor will be subtracted from the distance used to calculate the speed of the pitch. For a reasonable sized adult pitcher the adjustment factor may be on the order of 5-7 feet.

In other embodiments of the invention multiple adjustment factors may be entered: one for the start point and the other for the end point. This can be used to adjust for both the release point of the pitcher as well as the end point location of the catcher's glove. In still other embodiments of the invention no adjust factor may be used as the difference between the release point of the pitcher hand relative to the rubber and the end point of the catcher's glove relative to home plate will roughly correspond.

Thus, a method and apparatus for measuring the speed of a moving object has been described. While the description is the invention is provided in terms of various embodiments, the scope of the invention should not be limited to the described embodiments, but rather the scope of the invention is set forth in the claims.

The invention claimed is:

1. A method for measuring a speed of an object comprising the steps of:
   a. taking a video of said object moving across a span;
   b. displaying a first frame of said video wherein said object it at a start point;
   c. designating said first frame as said start frame;
   d. displaying a second frame of said video wherein said object is at an end point;
   e. designating said second frame as said end frame;
   f. calculating a time difference between said start frame and said end frame.

2. The method as set forth in claim 1 wherein steps b-e are performed via the steps of:
   b.1 performing motion detection on said video;
   b.2 setting said start frame to a frame in which motion of a small object is detected;
   b.3 setting said end frame to a frame in which motion of a small object is not detected.

3. The method as set forth in claim 1 further comprising the steps of:
   a. displaying said video;
   b. displaying a start frame indicator;
   c. displaying an end frame indicator;
   d. displaying said speed.

4. The method as set forth in claim 3 wherein said start frame indicator is displayed over said video.

5. The method as set forth in claim 1 further comprising the step of appending a second video to said video before exporting.

6. The method as set forth in claim 1 wherein said video is taken at a rate of at least 40 frames per second.

7. The device as set forth in claim 1 wherein the span is equal to the distance between a pitcher mound to home plate.

8. The method as set forth in claim 1 further comprising the steps of:
   calculating an average speed and a peak speed; and
   displaying said average speed and said peak speed.

9. A method for measuring the speed of a moving object comprising the steps of:
   a. receiving a video of a moving object;
   b. receiving a distance;
   c. determining a time span for said moving object as it moves across said distance using said video;
   d. calculating a speed for said moving object.

10. The method as set forth in claim 9 wherein step c is comprised of the steps of:
    c.1 identifying a start frame in said video;
    c.2 identifying an end frame is said video;
    c.3 calculating said time span based on said start frame and said end frame.

11. The method as set forth in claim 10 wherein step c.3 is comprised of the steps of:
    c.3.a receiving a start time stamp for said start frame;
    c.3.b receiving an end time stamp for said end frame;
    c.3.c calculating the difference between said start time stamp and said end time stamp.

12. The method as set forth in claim 10 wherein step c.3 is comprised of the steps of:
    c.3.a receiving a start frame index;
    c.3.b receiving an end frame index;
    c.3.c receiving a frame rate for said video;
    c.3.d calculating a time span based on said start frame index, said end frame index and said frame rate.

13. The method as set forth in claim 10 further comprising the step of
    displaying a burst style indicia over said end frame at the location of said moving object on said end frame.

14. The method as set forth in claim 9 further comprising the steps of:
    e. receiving path points for said moving object;
    f. placing indicia on said video based on said path points.

15. The method as set forth in claim 9 wherein said distance is a number selected from the set of 45 or 60.5 feet.

16. A device for measuring a speed of an object travelling across a distance, the device comprised of:
    video recorder for recording a video of the object, said video being comprising of frames;
    display for displaying said video;
    input for receiving a start frame indication and for receiving an end frame indication; and
    processor for determining a time span between said start frame and said end frame, and for calculating the speed of the object using said time span and the distance.

17. The device as set forth in claim 16 wherein said video recorder has a frame rate of at least 60 frames/sec.

18. The device as set forth in claim 16 wherein said input and said display are integrated as a touch screen, and said display is further for displaying a set start frame input.

19. The device as set forth in claim 16 wherein said input and said display are integrated as a touch screen, and said display is further for displaying a set end frame input.

20. The device as set forth in claim 16 wherein said input and said display are integrated as a touch screen, and said input is used to index through said frames of said video.

21. The device as set forth in claim 16 wherein said display is further for displaying said speed.

22. The device as set forth in claim 16 wherein display is further for displaying said video in slow motion and for displaying a start indicator for said start frame and an end indicator for said end frame.

23. The device as set forth in claim 16 wherein said distance is the distance between a pitchers mound and home plate.

24. A method for displaying a moving object comprising the steps of:
    receiving a video recording of said moving object;
    inputting a first location point corresponding to a first location of said moving object in a first frame of said video;
    inputting a second location point corresponding to a second location of said moving object in a second frame of said video;
    displaying said video with a graphic inserted, said graphic tracing a path from said first location to said second location.

25. The method as set for in claim 24 wherein said first location and said second location are input via a user touching a display screen.

26. The method as set forth in claim 25 wherein at least a portion of frames from said video are displayed at higher resolution when said user is inputting said first location and said second location.

27. The method as set forth in claim 25 wherein said first location is displayed to said user along with an option to reject or select said first point.

28. The method as set forth in claim 24 wherein said first location and said second location are input via a movement detection system.

29. The method as set forth in claim 24 further comprising the steps of
   designating a start frame in said video;
   designating an end frame is said video;
   receiving a distance;
   calculating a time span between said start frame and said end frame;
   calculating a speed based on said time span and said distance.

30. The method as set forth in claim 29 further comprising the step of:
   displaying said speed.

\* \* \* \* \*